United States Patent [19]
Thompson et al.

[11] Patent Number: 5,407,134
[45] Date of Patent: Apr. 18, 1995

[54] LIQUID DISTRIBUTION SYSTEM

[75] Inventors: Allen C. Thompson, Castro Valley, Calif.; Max H. Parks, Glenside, Pa.

[73] Assignee: FMC Corporation, Chicago, Ill.

[21] Appl. No.: 986,225

[22] Filed: Dec. 7, 1992

[51] Int. Cl.[6] ............................................. A01C 23/04
[52] U.S. Cl. ..................................... 239/156; 220/565; 220/23.86; 111/118
[58] Field of Search ..................... 239/155–157; 111/52, 55, 59, 118, 129, 903, 904; 220/565, 23.83, 23.86

[56] References Cited

U.S. PATENT DOCUMENTS

| | | | |
|---|---|---|---|
| 3,550,854 | 12/1970 | Fischer | 239/155 |
| 3,894,690 | 7/1975 | Hill | 239/61 |
| 4,191,262 | 3/1980 | Sylvester | 111/52 |
| 4,274,585 | 6/1981 | Lestradet | 239/157 |
| 4,650,124 | 3/1987 | Connaughty et al. | 239/157 |
| 4,697,739 | 10/1987 | McCracken et al. | 239/157 |
| 4,721,245 | 1/1988 | van Zweeden | 239/155 |
| 5,004,155 | 4/1991 | Dashevsky | 239/157 |
| 5,022,547 | 6/1991 | Spangler et al. | 220/23.86 |

*Primary Examiner*—Karen B. Merritt
*Attorney, Agent, or Firm*—R. C. Kamp; R. B. Megley

[57] ABSTRACT

A liquid distributor having a pair of variable displacement pumps driven by a single electric motor, the rotation speed of which is determined by a voltage from a controller in response to a predetermined ground speed and application rate which mixes a chemical with water in a desired proportion and delivers a solution to be directed into an open furrow just prior to the furrow being covered with dirt.

13 Claims, 3 Drawing Sheets

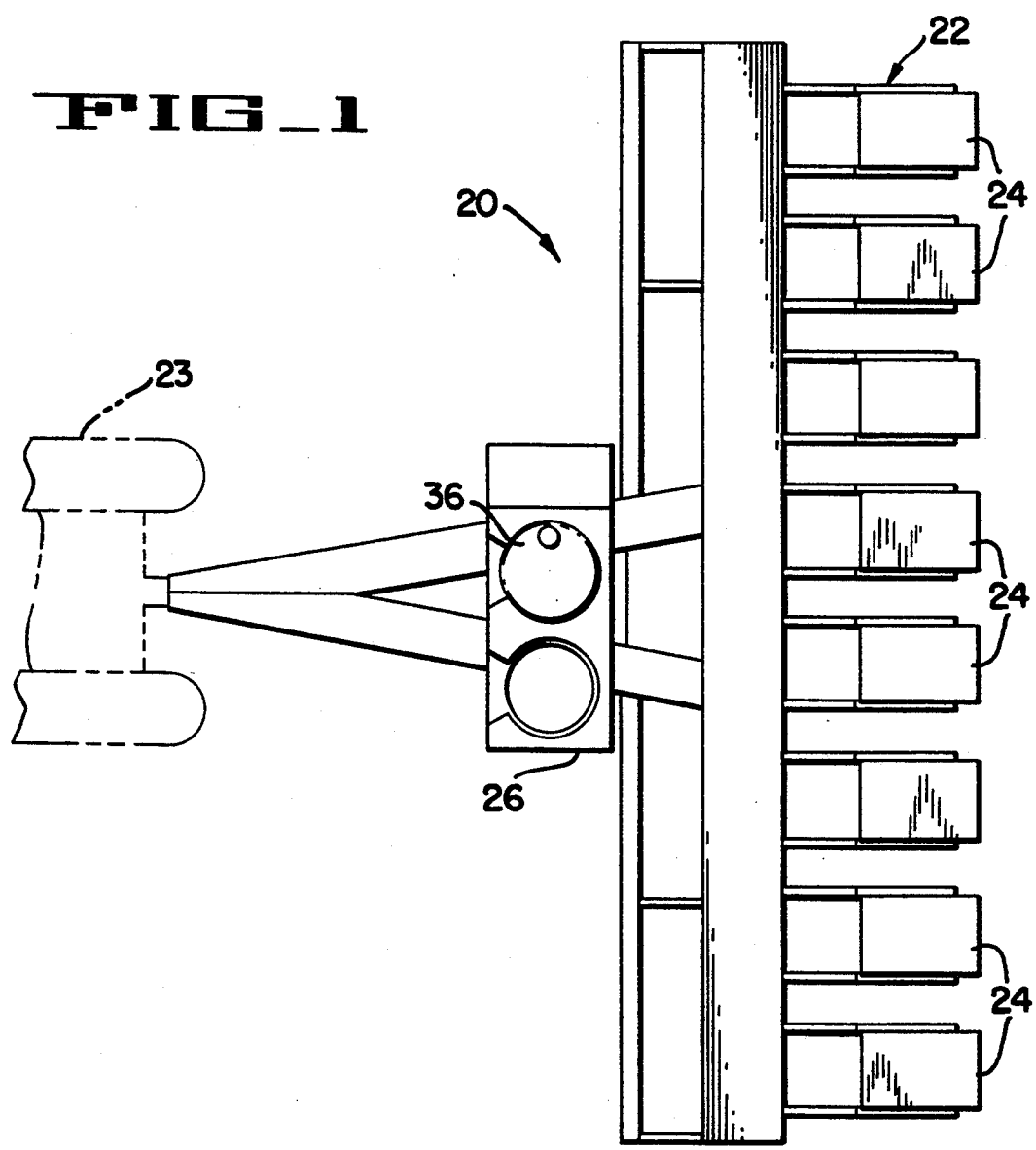
FIG_1
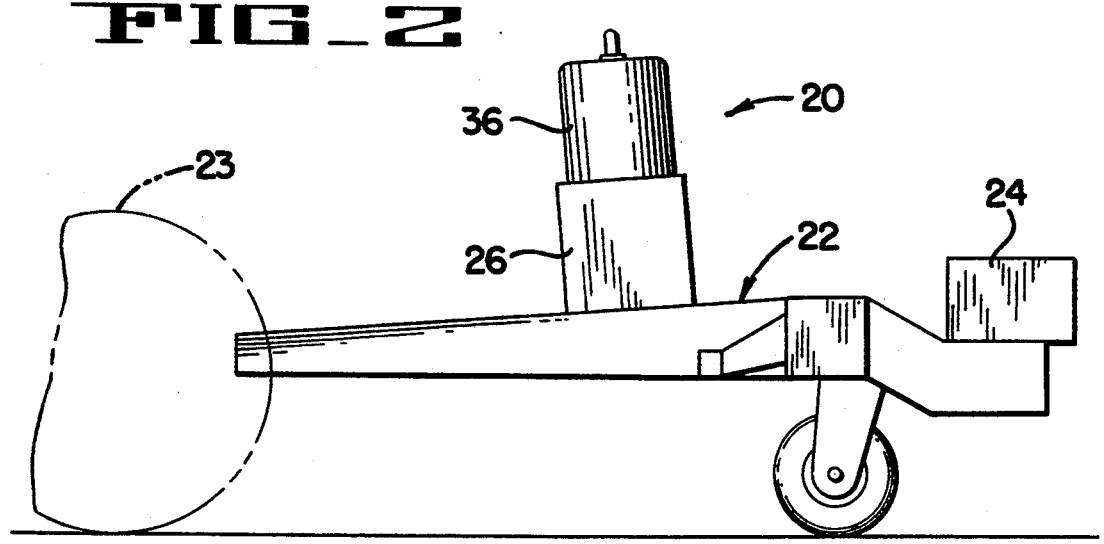
FIG_2

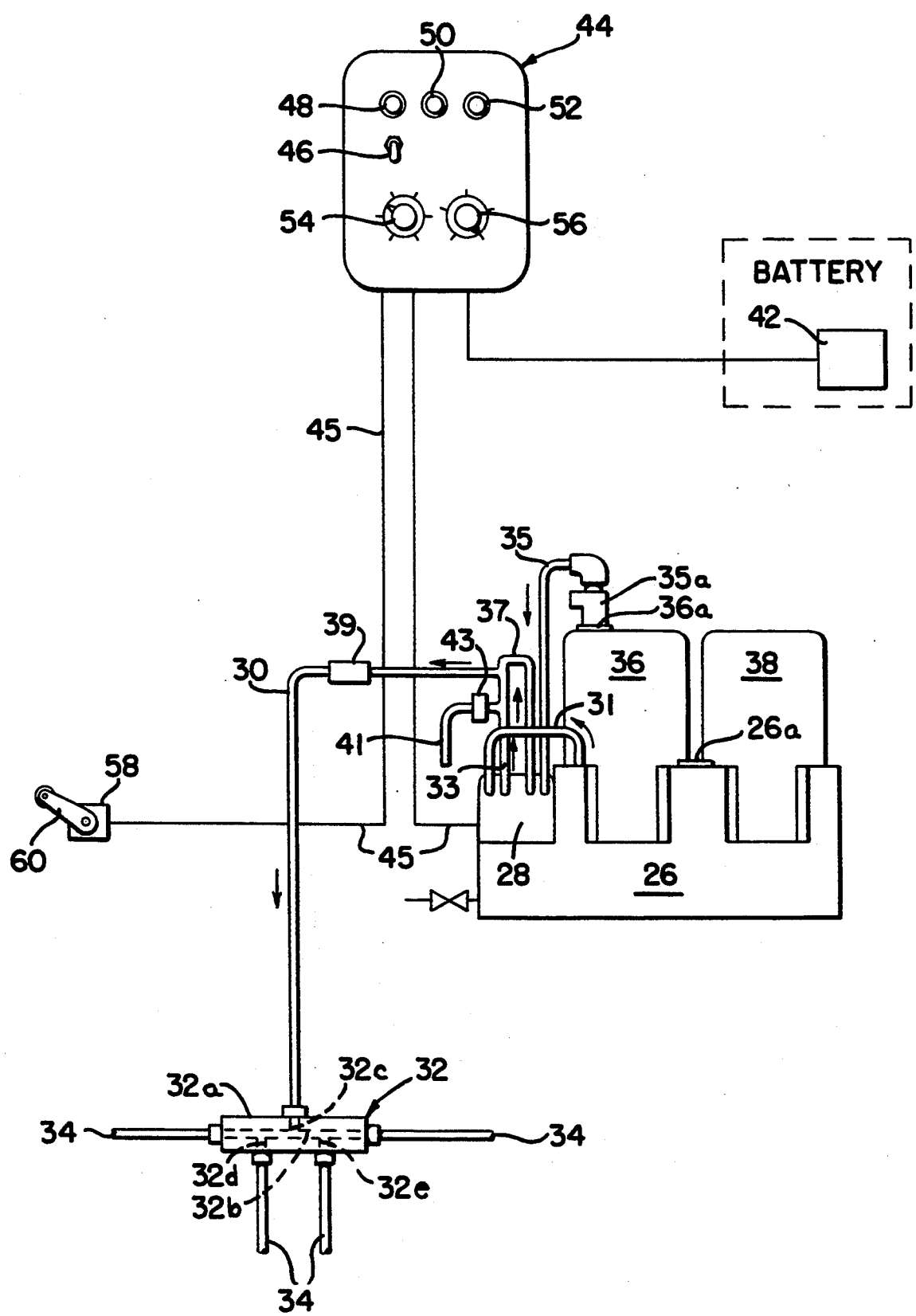

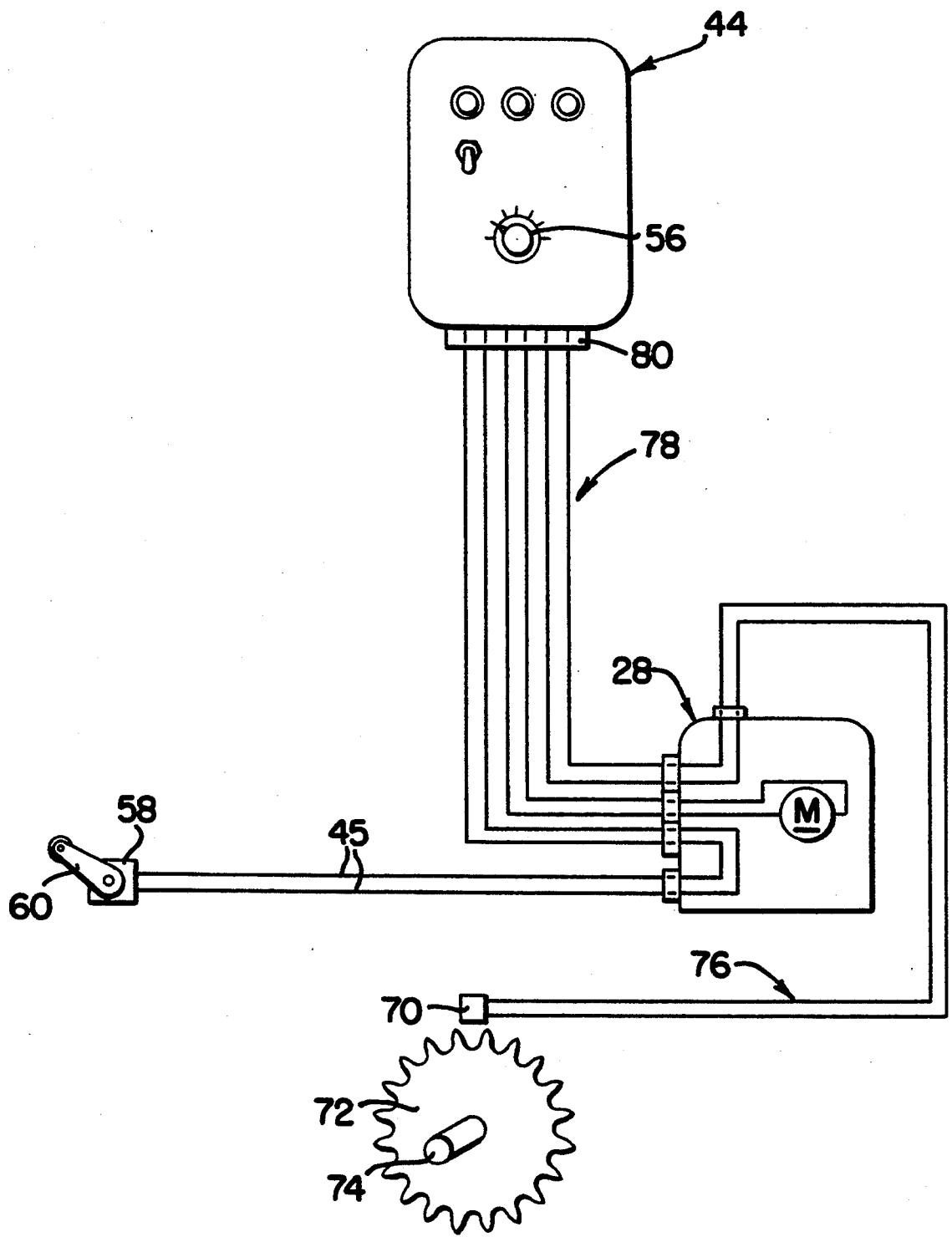

LIQUID DISTRIBUTION SYSTEM

BACKGROUND OF THE INVENTION

Field of the Invention

The present invention relates to liquid distributors, and more specifically to distributors which apply chemicals in furrows, which furrows are seeded and covered with dirt.

SUMMARY OF THE INVENTION

The present invention is a liquid distributor system to apply insecticide of a precise concentration in furrows at an accurate rate and is capable of being supported on a wide variety of planters for treatment of various crops. The system uses a pair of valveless piston pumps which can meter two liquids simultaneously to provide a precise concentration. The output of each pump is controlled two ways; first by manual adjustment of the pump displacement per revolution, and second by a cab mounted controller, which can adjust the rotational speed of the pumps. The controller is unique since it allows "on the move" output adjustments, based on speed of the vehicle and desired application rate in volume per unit area. The system incorporates a switch which shuts the system off when the planter is not operational. Also, operating lights in the cab of the towing tractor provides information regarding control system status. A unique feature of the system is the ability to remove concentrated insecticide from reusable containers, properly dilute the concentrate with water to achieve the precise proportion or ratio of chemical and water and accurately place the diluted pesticide directly in furrows, which allows growers to use pesticide with reduced risk of exposure.

The water reservoir serves as a holder for the containers and also serves as a mounting base for the pump unit. The water is used to supply the pump during application to dilute the concentrated insecticide, to rinse the system after application, and may be used as an emergency water supply.

BRIEF DESCRIPTION OF THE DRAWINGS

FIG. 1 is a plan view of a conventional planter with a liquid distribution system according to the present invention mounted thereon.

FIG. 2 is a side elevational of the apparatus shown in FIG. 1.

FIG. 3 is a schematic diagram illustrating the electrical and fluid system according to the present invention.

FIG. 4 is a schematic similar to FIG. 3 but illustrating another embodiment of the invention.

DESCRIPTION OF THE PREFERRED EMBODIMENT

The liquid distributor 20 (FIGS. 1-3) of the present invention is mounted on a multi-row planter 22 which is connected to a conventional tractor 23 that pulls the liquid distributor 20 along evenly spaced furrows in fields which are to be treated with a liquid chemical, such as an insecticide/nematicide, for example. The multi-row liquid distributor 20 directs the liquid chemical into the open furrows. Seeds are dropped from seed dispensers 24 on the planter 22 into the open furrows. The conventional multi-row planter 22 includes means, such as discs, which cover the rows with dirt after the chemical spray has been applied to each row.

As shown in FIG. 3, a reservoir 26, which holds a supply of water, is preferably formed with deep walls to support and retain one or more chemical containers 36 and 38, such as the reusable type in which insecticide/nematicide is sold, as well as a pump unit 28. The pump unit 28 comprises two pumps driven by a single electric motor, such as that sold by Fluid Metering, Inc. as their Model Q2B duplex pump. One of these pumps draws water from the reservoir 26 through a suction conduit 31 and discharges it under pressure through discharge conduit 33 into a supply conduit 30. The other pump of unit 28 draws concentrated chemical from the container 36 through conduit 35 and discharges the chemical under pressure through conduit 37 into the supply conduit 30. To insure a complete mixing of the water and chemical, an in-line static mixer 39 is interposed in the conduit 30. A conduit 41 communicates with the discharge conduit 33 and discharges in a protected position close to the ground. A pressure relief valve 43 is interposed in the conduit 41. By placing the pressure relief valve 43 on the discharge conduit which does not normally communicate with insecticide, there is less likelihood of the valve 43 becoming fouled or corroded, and insures rinsing of the system will be more effective. The supply line 30 connects with a pressure manifold 32. A plurality of micro tubes 34, which are flexible tubes having a relatively small internal diameter, which may be on the order of 0.075 inches, for example, are connected to the manifold 32 and are secured at their free ends by any conventional means so that the chemical solution discharged from the open end of the microtubes will be applied directly into each open furrow. Microtubes are used in order to eliminate the need for nozzles, which are susceptible to being clogged. By making all of the microtubes of the same length and with the same internal diameter, the pressure drop between the manifold 32 and the open end of the microtubes 34 will be the same. This results in equal resistance in each of the microtubes assuring equal flow distribution among all of the furrows supplied by the manifold 32. The internal diameter of microtubes is selected as the best compromise of two goals: 1) achieving a continuous stream, as opposed to dripping, out of the microtube at the lowest flow-rate, and 2) achieving a pressure that is not too high at the largest flow rate. Typically planters are used in configurations comprising multiples of 4 or 6, with 24 rows being the largest normally used. It is, therefore, preferred that each manifold 32 be supplied with outlets for four microtubes 34. So arranged, a single manifold 32 could supply a four row planter and two manifolds an eight row planter with the supply conduit 30 split downstream of the mixer 39 to connect with both manifolds. Similarly, three and four manifolds would supply twelve and sixteen row planters respectively. By closing one of the outlets in the manifold 32 with a plug, two manifolds can supply a 6 row planter, which allows a wide range of planters to be equipped with the invention with a minimum number of parts being required. To assure that multiple manifolds are each supplied with the same pressure, the internal area of the supply conduit 30 must be greater than the combined internal areas of the microtubes 34. The use of manifolds supplying only 3 or 4 microtubes solves a problem created by the overall physical width of multi-row planters. The length of microtube required to reach the last row unit of a multiple row planter causes the pressure to supply all rows with an equal flow of chemical solution to be excessively high. If the internal diameter of the microtubes is increased in order to reduce the pressure drop between the manifold and the end of the microtubes, the velocity of the liquid transmitted through the microtubes is reduced and, as a consequence, it is difficult to maintain a continuous stream.

Each of the pumps of the pump unit 28 is of the variable displacement type so that the proper quantity and proportion of water and concentrated chemical will be supplied to the conduit 30. The flow rate required for an 8-row planter having two manifolds 32 will be greater than for a 4-row planter having a single manifold 32. The manual adjustment, not shown, is therefore provided for each pump of the unit 28 to provide the needed flow rate with the desired concentration of chemical solution. Both pumps of the unit 28 are driven by a single D.C. electric motor, the rotational speed of which is controlled by varying the voltage supplied to it. A battery 42, which preferably is connected to and charged by the 12 is volt system of the tractor 23 supplies electric power to a controller 44, which controller determines the voltage to be supplied to the motor of the unit 28 through electric cable 45. The controller 44 is of the pulse width modulated type and IR compensated. The actual motor speed is sensed by the controller from the back EMF of the motor. The variable inputs to the circuit of the controller 44 are through knobs 54 and 56 which set variable resistors in the controller circuit. Knob 54 is set to the ground speed at which the tractor 23 is being driven, and may be adjusted as the tractor is being operated, and the knob 56 is set to a predetermined application rate. The actual motor speed, as set by the controller 44, is equal to the maximum motor speed times (tractor speed as set by knob 54 divided by maximum tractor speed) times (application rate as set by knob 56 divided by maximum application rate). For example, if the maximum tractor speed is 8 mph and the maximum application rate is 32 ounces per acre, the controller would set the motor speed equal to maximum motor speed X (tractor speed/8) X (application rate/32). As a result of these settings, the controller 44 will supply the proper voltage through cable 45 to rotate the motor in unit 28 at the proper rotational speed in order to achieve the desired application rate, e.g. in ounces per acre, when the tractor 23 is driven at the selected speed. Since the motor speed increases with increases in voltage, the controller 44 will supply such increases to increase the output from the pumps when the application rate is increased while holding the ground speed constant, and conversely. Similarly, the controller will supply higher voltage to the motor should the ground speed be increased while holding the application rate constant, and conversely. The controller 44, which is mounted in the cab of the tractor 23, also has an on-off switch 46 as well as indicator lights (i) 48 to indicate the controller is powered-up (on), (ii) 50 to indicate the motor of the unit is energized, and (iii) 52 to indicate a motor overload situation. In this situation the controller limits the current to protect the motor windings. A switch 58 is connected to the controller so that the controller will de-energize the motor of the unit 28, and hence stop discharge from the microtubes 34, when seeds are not being dispensed by the planter, such as, for example, at the end of a row. The switch 58 is actuated by an arm 60 which engages an appropriate part of the planter 22. When the planter is in its lowered planting position the switch 58 is attached so that the controller turns on the motor of unit 28, but when the planter frame is raised to its non-planting position the arm 60 rotates to its free position and the controller de-energizes the motor.

Some farmers will choose to apply a second liquid, such as a liquid fertilizer, along with the insecticide/nematicide. In order to do that suction conduit 31, which, as shown in FIG. 3, is connected to the water reservoir 26, is instead attached to the container 38 filled with liquid fertilizer. As so connected, the pumps of the unit 28, will draw the liquid fertilizer from container 38 and the insecticide/nematicide from container 36 for mixing and distribution in the same manner as when water and insecticide/nematicide are mixed and distributed. The water in reservoir 26 is used for rinsing the system after each day's use. If the second liquid was being applied, the conduit 31 must be disconnected from the container 38 and reconnected to the reservoir 26. In addition, the conduit 35 must be disconnected from the container 36 and also connected to the reservoir 26. A convenient way to achieve this is to provide a quick disconnect connector 35a on the end at conduit 35 which may engage either a complementary fitting 36a provided on the container 36 or a similar fitting 26a provided on the reservoir 26. With both suction conduits 31 and 35, so connected, operation of the pumps of the unit 28 will direct water from the reservoir 26 through the entire system to thoroughly rinse it. Thorough rinsing is dependent, in part, on the lack of dead space within the manifold 32. As shown in FIG. 3, the body 32a of the manifold has a longitudinal bore 32b has a cross-bore 32c with which the conduit 30 communicates, intersecting bore 32b. Cross-bores 32d and 32e intersect the bore 32b opposite the bore 32c. The microtubes 34 are connected to the opposite ends of the longitudinal bore 32a and to the bores 32d and 32e, so that no dead space exists for accumulation of insecticide/nematicide. When three microtubes 34 are connected to manifold, instead of four as shown, a plug is inserted in one of the bores 32d and 32e, which when fully seated to is seal the selected one of these cross-bores completely fills that cross-bore so that no dead space is created.

The embodiment shown in FIG. 4 is similar to the one of FIG. 3 except that the manual input, as represented by knob 54, has been replaced by an automatic and continuous input related to actual ground speed. The predetermined application rate is still set by the knob 56. The actual ground speed is derived by a proximity sensor, such as a hall effect or eddy current sensor, which is mounted adjacent a sprocket 72 secured to the jack shaft 74. The jack shaft 74 is driven by a ground wheel of the planter 22, a customary arrangement on conventional planters. The proximity sensor 70 senses each of the teeth on the sprocket 72 as it is rotated by the ground-driven jack shaft 74. The resulting signals from the sensor are transmitted to the controller 44. Since the planter 22 must be disconnected from the tractor 23, it is preferred that the cable 76 from the sensor 70 extend to the unit 28 and conductors be incorporated in the cable 78 extending between the controller 44 and the unit 28. A connector 80 on the end of the cable 78 is releasably insertable into a mating connection on the controller to permit quick and easy connection and disconnection of the controller 44 with the unit 28 when the planter 22 is respectively attached and detached from the tractor 23. A similar arrangement is provided for the switch 58. The sensor 70 provides signals to the controller 44 which permits an automatic and continuous indication of actual ground speed. The controller 44 otherwise functions in the same manner as described previously.

Although two embodiments contemplated for carrying out the present invention has been herein shown and described, it will be apparent that modification and variation may be made without departing from what is regarded to be the subject matter of the invention as defined by the scope of the appended claims.

What is claimed is:

1. A towable liquid distributor for applying liquid chemicals held in a container comprising:
   a reservoir capable of holding water;
   first and second pumps each being variable displacement and capable of drawing chemical from said container and water from said reservoir respectively;
   an electric motor connected to drive both of said pumps;
   a supply conduit for receiving the chemical and water discharged by said pumps;
   a manifold connected to said supply conduit; and
   a plurality of flexible tubes connected to said manifold.

2. The invention according to claim 1 wherein a means for mixing said chemical and water is interposed in said supply conduit.

3. The invention according to claim 1 and further comprising:
   a controller for generating an output voltage as a function of ground speed and application rate; and
   said motor connected to receive said voltage and having a rotational speed which is a function of the voltage supplied thereto.

4. The invention according to claim 1 wherein said tubes are of the same length and internal diameter.

5. In combination with a tractor-drawn multi-row planter, which planter can be lowered to a planting position, a liquid distribution system capable of applying liquid chemical held in a container;
   a reservoir mounted on said planter and capable of holding water;
   a pair of variable displacement pumps capable of drawing chemical from said container and water from said reservoir;
   an electric motor connected to simultaneously drive both of said pumps;
   a supply conduit for receiving the chemical and water discharged by said pumps;
   a manifold connected to said supply conduit; and
   a plurality of flexible tubes connected to said manifold.

6. The invention according to claim 5 wherein a means for mixing said chemical and water is interposed in said supply conduit.

7. The invention according to claim 5 and further comprising;
   a controller for generating an output voltage as a function of ground speed and application rate; and
   said motor connected to receive said output voltage and having a variable rotational speed which is a function of said output voltage.

8. The invention according to claim 7 and further comprising:
   a sensor for determining actual ground speed of said planter and
   means for manual input of a desired application rate.

9. The invention according to claim 5 wherein said tubes are of the same length and internal diameter.

10. The invention according to claim 5 and further comprising means responsive to raising said planter from its planting position to de-energize said motor.

11. A towable liquid distributor for applying first and second liquid chemicals held in first and second containers comprising:
    first and second variable displacement pumps capable of drawing liquid from said first and second containers respectively;
    a variable speed electric motor connected to drive both of said pumps;
    a supply conduit for receiving the liquids discharged by said pumps;
    a manifold connected to said supply conduit: and
    a controller for varying the speed of said electric motor.

12. The invention according to claim 11 and further comprising:
    a reservoir for holding water: and
    means for disconnecting said pumps from said containers and connecting said pumps to said reservoir.

13. The invention according to claim 11, wherein said controller varies the speed of said electric motor as a function of ground speed and application rate.

* * * * *